United States Patent [19]
Callahan et al.

[11] 3,867,647
[45] Feb. 18, 1975

[54] ANALOG SPEED DETECTOR

[75] Inventors: Bernard E. Callahan, Hoffman Estates; Philip M. Higgins, Chicago, both of Ill.

[73] Assignee: Vapor Corporation, Chicago, Ill.

[22] Filed: May 29, 1973

[21] Appl. No.: 364,298

[52] U.S. Cl. ............. 307/233 A, 307/227, 307/228, 307/265, 307/285, 328/127, 317/5, 307/246
[51] Int. Cl. ............................................ H03k 5/18
[58] Field of Search ............ 328/140, 127; 307/201, 307/233, 246, 227, 228; 265, 285; 317/5

[56] References Cited
UNITED STATES PATENTS

| | | | |
|---|---|---|---|
| 3,414,735 | 12/1968 | Harris et al. | 307/201 |
| 3,581,217 | 5/1971 | Isaacs | 307/233 |
| 3,590,277 | 6/1971 | South | 328/140 X |
| 3,699,357 | 10/1972 | Lloyd | 307/246 X |
| 3,782,784 | 1/1974 | Marouby | 328/140 X |

*Primary Examiner*—John S. Heyman
*Attorney, Agent, or Firm*—Lloyd L. Zickert

[57] ABSTRACT

A speed detector for producing from the output of an axle-mounted transducer an analog output signal indicative of the speed of a moving vehicle. A signal processing circuit responsive to the output of the transducer generates a square-wave control signal which is utilized to control the recurrent charging and discharging of an error integrating capacitor. The rate of discharge of the capacitor is such that an error voltage is developed across the capacitor indicative of the vehicle speed error, and an FET switch controlled by the square-wave periodically applies this error as a pulse to a storage integrator. By varying the discharge rate of the capacitor in accordance with the voltage developed in the storage integrator, an analog output signal indicative of vehicle speed is developed. By controlling the conduction time of the FET switch, the effectiveness of the error on the analog output signal is proportioned to the absolute speed error of the vehicle.

16 Claims, 12 Drawing Figures

ANALOG SPEED DETECTOR

This invention relates in general to an analog speed detector, and more particularly to a pulse-rate to analog conversion circuit for railroad vehicles which provides improved response to changes in vehicle speed and improved accuracy at low operating speeds.

With the advent of electronic train control systems for automatically controlling the speed of rapid transit cars and locomotives, the need has arisen for a speed detector which provides an accurate and spontaneous indication of operating speed. In addition to enabling the train control system to maintain an accurate running speed, this information enables the system to properly control acceleration and deceleration for maximum operating efficiency and passenger comfort, and in conjunction with an anti-skid system, to avoid undesirable wheel spin and skid during starting and stopping.

In sensing the motion of railroad vehicles it has become almost universal practice to employ electromagnetic pick-ups rotatably coupled to one or more of the train axles. These pick-ups generally consist of a rotary magnet which induces a signal in an adjacent coil for each one of some fractional part of a wheel revolution, the resulting signal being converted to an analog DC voltage by a pulse-rate to analog converter, or speed detector circuit, prior to application to the train control system. While such pulse generators have provided generally satisfactory performance and have proven reliable and maintenance free in the hostile environment of transit car and locomotive undercarriages, the performance of the prior-art speed detector circuitry associated with these generators has not been entirely satisfactory, particularly with respect to applications in high performance transit cars where these circuits have had an excessively slow response rate.

The slow response rate of prior-art speed detector circuits, which develop their analog output voltage by charging a capacitor with a pulse of fixed width and constant current for each voltage pulse from the pick-up, and by then discharging the capacitor between pulses, results from the large filter capacities required to obtain a DC voltage from the saw-tooth voltage waveform developed across the capacitor. Accordingly, a need exists for a speed detector circuit which provides a DC output voltage with only a minimum amount of filtering, thereby achieving improved responsiveness to changes in vehicle speed. It is to such a circuit that the present invention is directed.

Another disadvantage of prior-art speed detector circuits has been their inability to provide an accurate analog output signal during low speed operation of a locomotive, such as where a string of hopper cars is loaded or unloaded while in motion. This inaccuracy resulted largely because of the low-level output provided by the tachometer-generator at low speeds, and the inability of the usual method of providing a pulse of fixed-width to a capacitor to provide an accurate output with large time periods between pulses. As will be presently explained, the speed detection system of the present invention overcomes this deficiency by use of a multiple-step operating cycle wherein the output voltage is corrected with each increment of rotation, typically 2½ inches, of the locomotive drive wheel.

The invention is directed to a speed detector for producing from an electrical speed-indicating signal having a frequency related to the actual speed of a moving vehicle an analog output signal indicative of the actual speed of the vehicle. The detector comprises means responsive to the speed-indicating signal for generating a control signal defining first and second operating periods, and error detection means for generating an error signal, the error signal progressively changing during the first operating period from a first predetermined initial voltage level to a final voltage level dependent on the duration of the first operating period, and remaining thereat during at least a portion of the second operating period. The detector further comprises integrating means for developing a signal representative of the amplitude of signals periodically applied thereto, transfer means for applying the error signal existing at the end of the first operating period to the integrating means during at least a portion of the operating period, and means responsive to the signal developed by the integrating means for controlling the rate of progression of the error signal such that the signal developed by the integrating means is indicative of the actual speed of said vehicle.

Accordingly, it is a general object of the present invention to provide a new and improved speed detector for providing an analog indication of vehicle speed.

It is a more specific object of the present invention to provide a new and improved speed detector which provides an analog output more responsive to changes in vehicle speed.

It is a still more specific object of the present invention to provide a new and improved speed detector which provides a more accurate analog indication at low operating speeds.

It is another specific object of the present invention to provide a speed detector for converting the output of an electric tachometer type transducer to an analog output voltage indicative of speed.

Other objects, features and advantages of the invention will be apparent from the following detailed disclosure, taken in conjunction with the accompanying sheets of drawings, wherein like reference numerals refer to like parts, in which:

While the analog speed detector of the present invention finds application in many different types of vehicles, it is most suited for use on railroad vehicles, and particularly on rapid transit type vehicles. Accordingly, the structure and functioning of the analog speed detector will be illustrated herein in conjunction with speed control systems for use on such rapid transit vehicles, and before considering the speed detector of the invention in detail, the general structure and operation of such systems will be considered.

Figure 1:
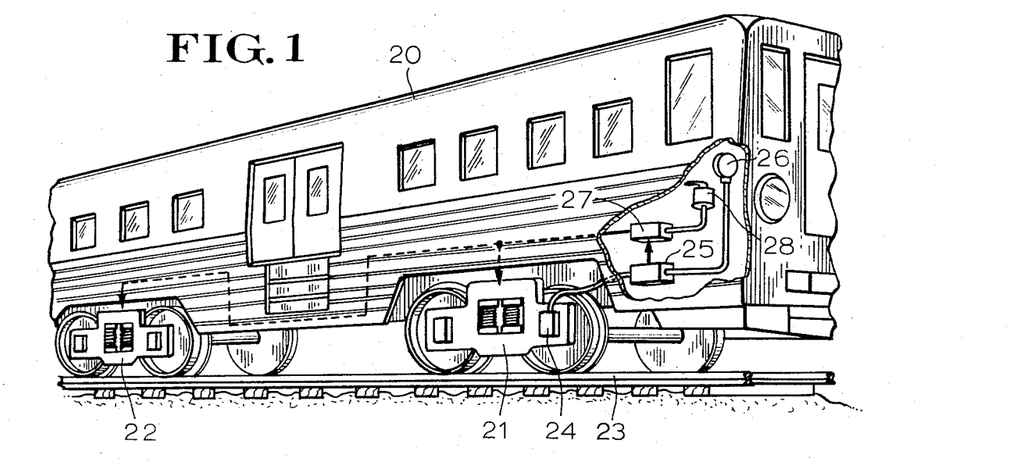
FIG. 1 is a perspective view of a portion of a rapid transit car incorporating a speed detector constructed in accordance with the invention.

Referring to FIG. 1, a rapid transit car 20 of conventional design is seen to have front and rear two-axle trucks 21 and 22, respectively, which may each contain one or more traction motors (not shown) for driving the car along a track 23. An electromagnetic pickup 24 may be provided on one of the axles to generate an output signal in the form of a series of pulses at a rate dependent on the rate of movement of the transit car. This signal is applied to an analog speed detector 25 which provides an analog DC voltage output signal indicative of the rate of movement of the transit car. Typically, this signal will be applied to a cab-mounted speed indicator 26 which may be either a speed-calibrated meter or a digital readout device for indicating the speed of the transit car to the motorman. In more recent transit car designs the output of detector 25 may also be applied to a train controller 27 which, in conjunction with a manual controller 28, may be utilized for automatically controlling or modifying the application of power to the various driving motors and braking systems of the transit car under certain circumstances.

Figure 2:
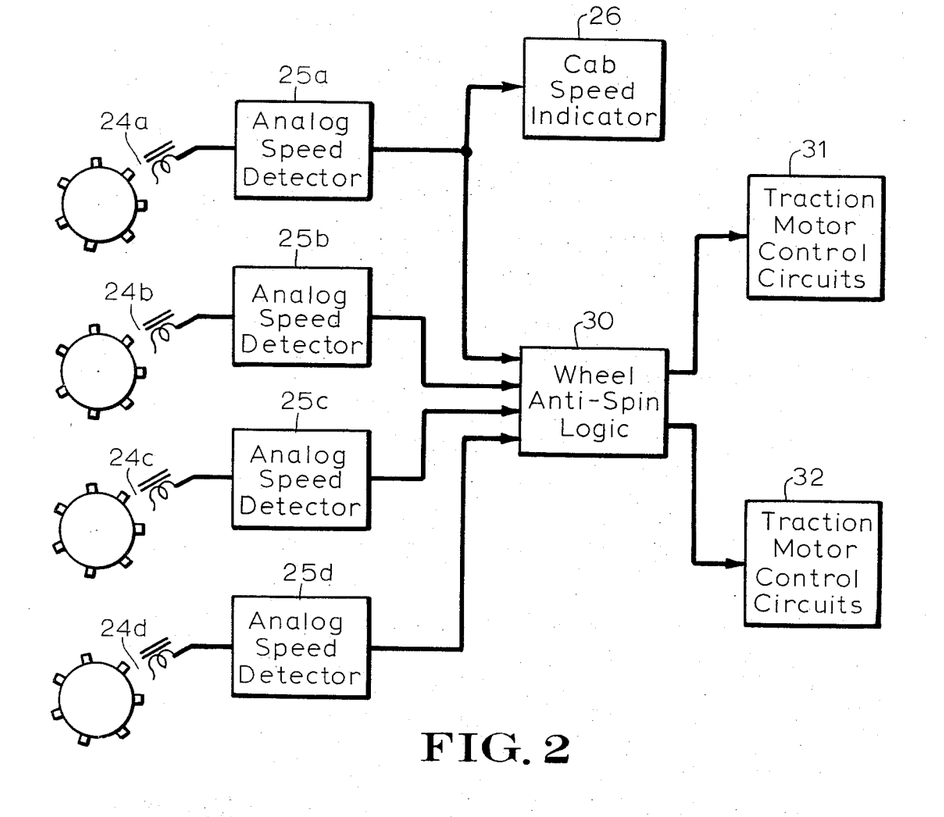
FIG. 2 is a functional block diagram of an anti-skid system utilizing the analog speed detector of the invention.

In recent transit car designs the basic control system shown in FIG. 1 has been expanded to utilize the speed information provided by the analog speed detector 25 to provide additional functions. For example, in FIG. 2 multiple speed detector circuits are utilized to indicate the rate of rotation of each of the four axles of the car, so that when it is determined that one axle is turning faster than the others an appropriate adjustment in the drive power applied to that axle can be made. Specifically, this system utilizes four electric tachometer-type transducers 24a–24d for providing output signals which indicate the rate of rotation of the four axles. The output of each transducer is converted by an associated one of analog speed detectors 25a–25d to an analog signal representative of the rate of motion of the wheel. The four analog signals are applied to a wheel anti-spin logic circuit 30, which compares the analog voltages to determine if one is excessively high or low compared to the others. Should this condition develop, an adjustment in the power applied to the associated traction motor is made through an appropriate one of the two traction motor control circuits 31 and 32. The output of analog speed detector 25a is also applied to the cab speed indicator 26, which we have seen may be either a conventional meter calibrated in units of speed, or a digital output indicator with appropriate analog to digital conversion circuitry.

Figure 3:
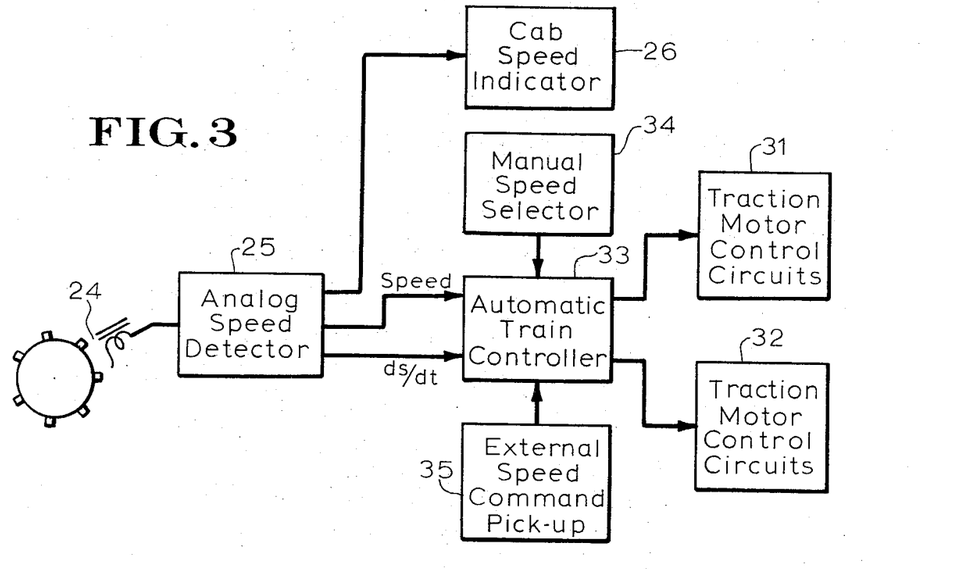
FIG. 3 is a functional block diagram of an automatic controller for a rapid transit car utilizing an analog speed detector constructed in accordance with the invention.

Because of its rapid response to changing vehicle speeds, the speed detector of the invention is also useful in conjunction with fully automatic train controlling systems, such as that illustrated in FIG. 3. There, as before, the electric tachometer-type transducer 24 produces an output signal which is applied to analog speed detector 25. One output of detector 25, as before, is applied directly to the cab-mounted speed indicator 26. Another output, also an analog signal representing the instantaneous speed of the vehicle, is applied to an automatic train controller 33 which contains appropriate logic and sensing circuitry for automatically starting, stopping, braking, and otherwise controlling the operation of the train without the need for an operator. An acceleration-deceleration indicative signal of the form $ds/dt$ is derived within detector 25 and also applied to train controller 33 for use in controlling the rate of acceleration and deceleration of the transit car following and preceding a stop. Train controller 33 may receive operating instructions either from a manual speed selector 34 on board the train, or from an external command link conveyed by induction or other means along the right of way and received by a pick-up circuit 35 for application to the controller. As in the preceding system, the output of the train controller is applied to a pair of traction motor control circuits 31 and 32 which control the power applied to the vehicle drive motors.

Figure 4:
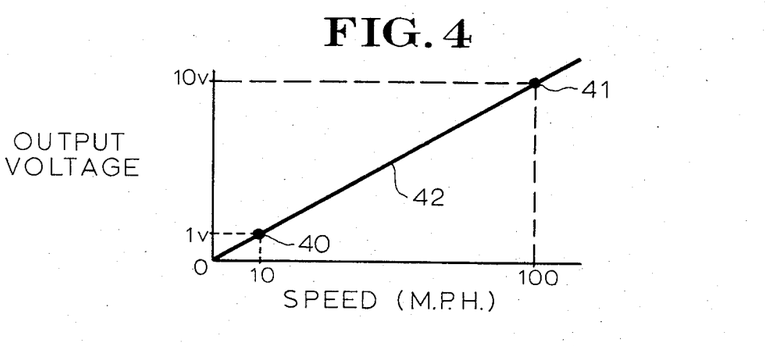
FIG. 4 is a plot of output voltage versus speed illustrating the operation of the analog speed detector of the invention.
Figure 5:
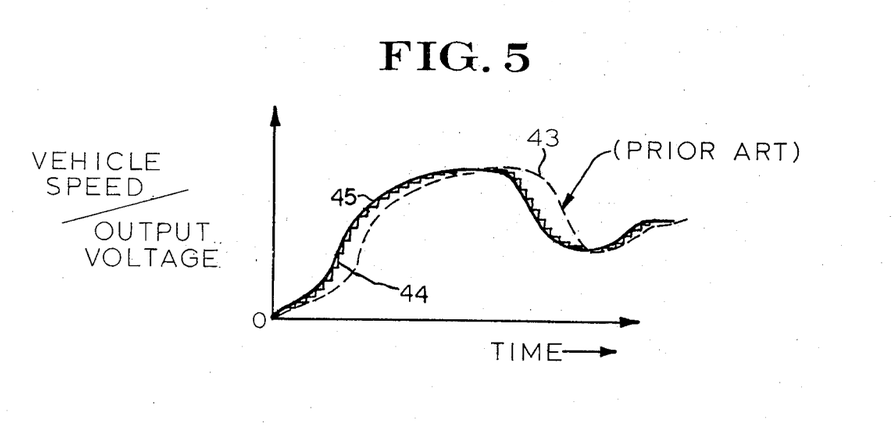
FIG. 5 is a plot of output voltage versus time and vehicle speed versus time illustrating the operation of the analog speed detector of the invention.

In order for an analog speed detector to be used in conjunction with the aforedescribed transit car anti-skid and automatic vehicle control systems, it is necessary that the detector provide an accurate and spontaneous indication of vehicle speed. This requirement is illustrated in FIGS. 4 and 5. Referring to FIG. 4, a plot of the desired analog output voltage from the speed detector versus the actual speed of the rapid transit vehicle is shown. Ideally this relationship should be a straight line such that the output and speed are directly proportional, e.g., the speed at 10 miles per hour is 1 volt and the speed at 100 miles per hour is 10 volts, as shown by the points 40 and 41 on the plot 42. In a manner to be presently explained, the novel circuitry of the present invention provides this linear relationship to a very substantial degree.

A further requirement of the analog speed detector utilized in the aforedescribed systems is that the output of the detector follows changes in vehicle speed as closely as possible. As we have seen, in the prior art this was often not possible because the large capacitances required to adequately filter the output precluded rapid changes in the analog output voltage. In contrast, the speed detector of the present invention provides an almost instantaneous indication of the vehicle speed. This is illustrated in FIG. 5, wherein the effects of the capacitive filtering on the prior art analog output signal are shown by trace 43, whereas the output of the present system, as represented by trace 44, is shown to closely follow the actual speed 45 of the vehicle.

Figure 6:
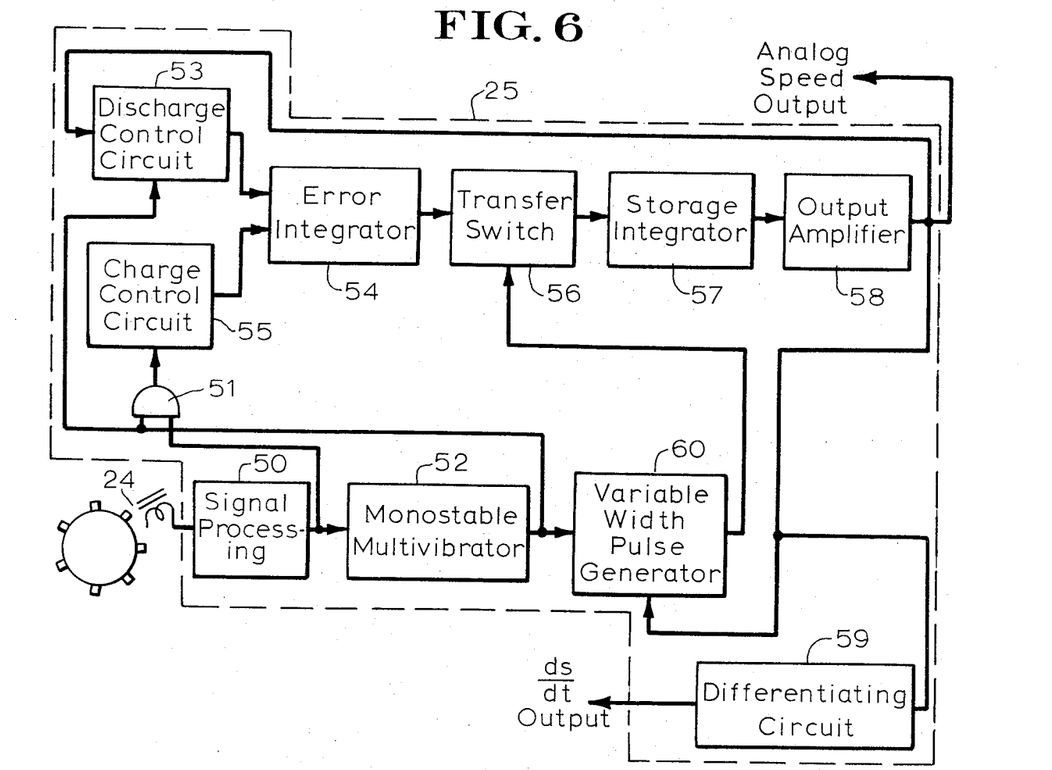
FIG. 6 is a functional block diagram of an analog speed detector constructed in accordance with the invention.

The structure and functioning of the speed detector of the invention may best be understood by reference to the functional block diagram of FIG. 6. There, the speed detector 25 is seen to comprise a signal processing stage 50 for receiving the output signal of the tachometer-type transducer 24, the latter signal having a periodic waveform of generally consistent but not necessarily sequential shape. The output of processing stage 50, which comprises a square-wave control signal having a frequency equal to that of the signal produced by transducer 24, is applied to one input of an AND gate 51 and to the input of a monostable multivibrator 52, the latter producing an output pulse of predetermined duration for each negative-to-positive transition in the applied square-wave. This output pulse is applied to the remaining input of AND gate 51 and to discharging means in the form of a discharge control circuit 53. The output of discharge control circuit 53 is applied to error detection means in the form of an error integrator 54, which contains circuitry for developing an output pulse indicative by its amplitude and polarity of the error in the rate of the pulses produced by signal processing stage 50 from a nominal rate. The output of AND gate 51 is applied to charging means in the form of a charge control circuit 55 which, in conjunction with discharge control circuit 53, controls the charging and discharging of a capacitor in error integrator 54 to obtain the desired output error pulse.

The output of integrator 54 is applied to transfer means in the form of a transfer switch 56 which controls the application of the error-indicative pulse to a storage integrator 57. This integrator develops an analog output signal dependent on the amplitude and duration of the error pulses transferred by switch 56 from error integrator 54. This signal is amplified in an output amplifier 58 and applied by way of appropriate interconnecting circuitry to the other components in the train control system with which the speed detector 25 is being utilized. Also, the analog output signal is applied back to the discharge control circuit 53, which we have seen controls the discharging of the timing capacitor in error integrator 54 to obtain a speed-indicative output signal. The exact manner in which this is accomplished will be covered in detail presently.

The output of amplifier 58 is also applied to a differentiating circuit 59, which differentiates the output signal to produce an additional output signal of the form $ds/dt$ to indicate the rate of change of the speed of the vehicle. The output of amplifier 58 is also coupled to a variable-width pulse generator 60. Upon the occurrence of each output pulse from monostable multivibrator 52 this stage produces a variable-width gating pulse which is utilized to control the operation of transfer switch 56. In practice, the faster the vehicle is operating the wider this gating pulse is so that errors developed in error integrator 54 are scaled according to the speed of the train. The exact manner in which this is accomplished will be considered presently.

Figure 7:
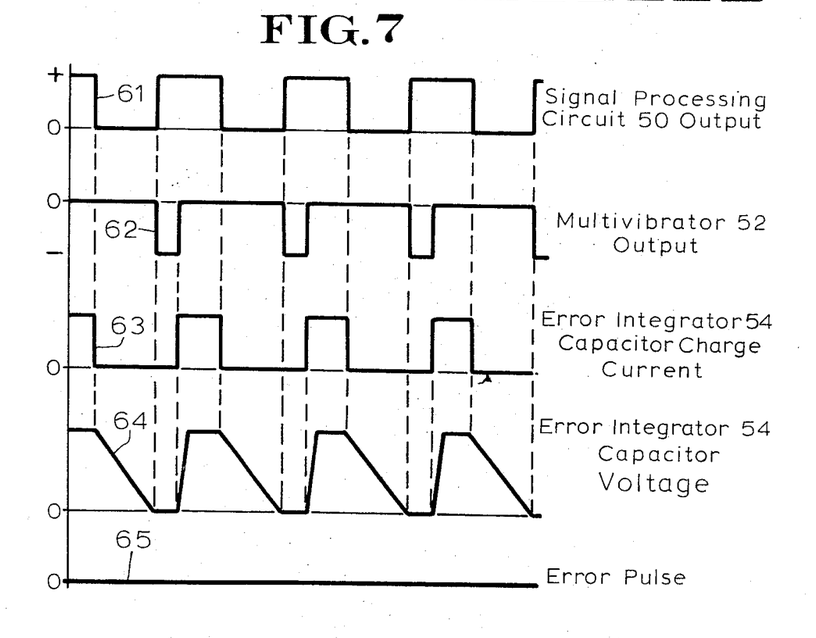
FIG. 7 is an illustration of waveforms useful in understanding the functioning of the speed detector of FIG. 6.

In operation, the signal produced by the axle-mounted transducer 24 is of irregular shape, and accordingly is applied to signal processing stage 50 which converts it to a square-wave control signal of like frequency, as shown by the waveform 61 in FIG. 7. The effect of the square-wave control signal thus developed, when applied to the input of AND gate 51, is to enable that gate on each positive half-cycle of the waveform. Monostable multivibrator 52 responds to each negative-to-positive transition of the square-wave to produce a control pulse of negative polarity, as shown by waveform 62 in FIG. 7. These pulses are applied to the remaining input of AND gate 51 and to the discharge control circuit 53. When the two signals applied to AND gate 51 are both positive, i.e., the square-wave is positive and no control pulse is being produced by multivibrator 52, charge control circuit 55 is enabled and proceeds to charge a capacitor in integrator 54, as illustrated by the waveform 63 in FIG. 7. As shown by the waveform 64 and as will be explained presently, this has the effect of establishing an initial charge on the capacitor and a predetermined initial voltage level.

Now, upon the occurrence of the positive-to-negative transition of the square-wave control signal from signal processing stage 50, AND gate 51 is inhibited by the negative polarity of the square-wave and charge control circuit 55 is disabled. However, since no pulse is present at the output of multivibrator 52, discharge control circuit 53 discharges the capacitor in integrator 54 by producing a current flow in the opposite direction to that which charged the capacitor by way of charge control circuit 55. In this connection, it will be appreciated that the terms charge and discharge are used in their relative sense, since the capacitor is actually being charged in opposite directions by circuits 53 and 55. The effect of the current from discharge control circuit 53 is to linearly reduce the voltage across the capacitor, as shown by the sloped portion of waveform 64. The discharge cycle continues until the square-wave again experiences a negative-to-positive transition, at which time the negative output pulse developed by monostable multivibrator 52 disables discharge control circuit 53. At this time the voltage across the capacitor in error integrator 54 is indicative of the state of charge of that element, and in the case of FIG. 7, the capacitor has zero charge and the voltage is zero volts.

The voltage developed across the capacitor in error integrator 54 is transferred as a pulse by transfer switch 56 during the interval when discharge control circuit 53 and charge control circuit 55 are disabled to storage integrator 57, which receives the error pulse and assumes a charge state closely related thereto. The operation of transfer switch 56 is controlled by pulse generator 60, which in turn is responsive to the leading edge of the pulses generated by monostable multivibrator 52. The width of the gating pulse generated by generator 60 is variable for reasons which will be explained presently, but in each case is less than the duration of the control pulse produced by monostable multivibrator 52, so that the error pulse actually transferred from error integrator 54 to storage integrator 57 is indicative of the final charge state of the capacitor in error integrator 54. In this case, as shown by waveform 65, the error is zero and the error voltage generated is zero.

Figure 8:
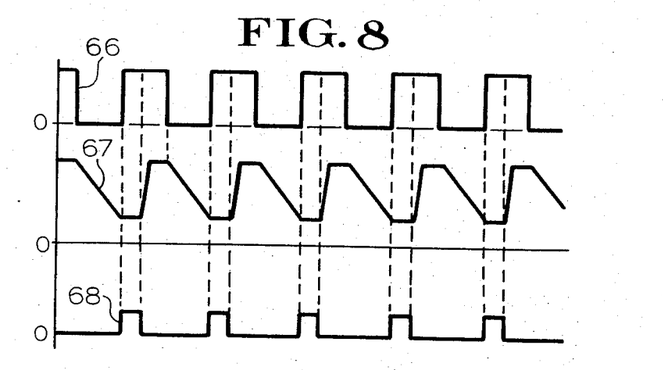
FIG. 8 is a further illustration of waveforms useful in understanding the functioning of the speed detector of FIG. 6.

In accordance with the invention, for a fixed discharge current through discharge control circuit 53 the final voltage existing on the capacitor in error integrator 54 will be dependent on the period of the square-wave control signal developed at the output of signal processing stage 50, and hence on the speed of the vehicle. Referring to FIG. 8, during vehicle speeds in excess of the nominal speed the square-wave control signal has a shorter period as illustrated by waveform 66, in response to a higher frequency output signal from transducer 24. As before, monostable multivibrator 52 produces a negative-polarity output pulse of fixed duration for each negative-to-positive transition of the squarewave, and as before the capacitor in error integrator 54 is charged to a predetermined maximum voltage level immediately following each such control pulse, as evidenced by the upper plateau of waveform 67. Upon the succeeding positive-to-negative transition of the square-wave the capacitor is discharged by control circuit 53, at a rate which we will assume to be the same as in the preceeding zero error condition. However, the next half-cycle of the square-wave now occurs before the capacitor can completely discharge, so that upon occurrence of the next control pulse from multivibrator 52 the capacitor contains a residual charge, resulting in a positive residual voltage level as evidenced by the lower plateau of waveform 67. As before, transfer switch 56 is enabled coincidently with the leading edge of the control pulse from multivibrator 52, and in this case causes the positive-polarity error existing on the capacitor to be transferred as pulses 68 to the storage integrator 57 wherein a positive DC voltage is developed in response thereto.

Figure 9:
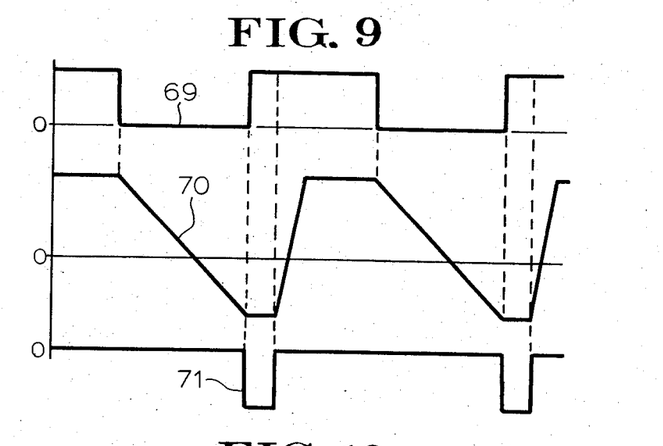
FIG. 9 is a further illustration of waveforms useful in understanding the functioning of the speed detector of FIG. 6.

Should the vehicle be moving more slowly than the nominal speed, as evidenced by the longer period of the square-wave control signal 69 in FIG. 9, the capacitor in integrator 54 will discharge from its initial voltage level, as evidenced by the upper plateau in waveform 70, beyond the zero voltage axis and will assume, at the time of the next negative-to-positive transition of the square-wave, a residual charge state such that a negative voltage exists across the capacitor, as shown by the lower plateau of waveform 70. As before, the control pulse from multivibrator 52 initiates an output pulse from error integrator 54 such that the negative-polarity voltage state is transferred as a pulse 71 through transfer switch 56 to the storage integrator 57. There, the DC potential developed in that stage is immediately reduced to establish a new DC output voltage representative of the final voltage across the capacitor.

Thus, for a fixed nominal charging rate for the capacitor of error integrator 54, an error pulse is developed having a polarity indicative of whether the vehicle is moving faster or slower than a nominal rate, as determined by the rate of charge of the integrating capacitor, and of a magnitude indicative of the degree of error from the nominal rate. Typically, the voltage pulse produced by error integrator 54 ranges from plus 6.2 volts to minus 6.2 volts, the end limits being determined by appropriate voltage limiting circuitry to be presently described.

For narrow ranges of error, the resulting output error pulse is approximately linearly related to the actual speed error. For example, an error of 10 percent or 1 mile per hour at a nominal speed of 10 miles per hour produces an error output pulse of 10 percent of 6.2 volts, or 0.62 volts. Similarly, a 10 percent or 10 mile per hour error at a nominal speed of 100 miles per hour results in an error of 10 percent of 6.2 volts, or 0.62 volts.

In practice it is desirable that the magnitude of the error pulse obtained be related directly to the absolute magnitude of the speed error, instead of to the percentage speed error. That is, it is not desirable that the same error voltage be produced for the 1 mile per hour and the 10 mile per hour errors of the above examples since widely different adjustments in driving power are dictated by the two speed errors. To maintain the effect of the error pulse developed by integrator 54 proportional to the actual speed error, and not to the percentage speed error, the speed detector of the invention includes means in the form of variable-width pulse generator 60 for modifying the transfer time allotted the error pulse between error integrator 54 and storage integrator 57 according to the analog output signal developed by amplifier 58, and hence according to the speed of the vehicle. This has the effect of narrowing or shortening the transfer time at low operating speeds to deemphasize the error, and of lengthening the transfer period at higher operating speeds to give the error signal greater weight. This is in accordance with the desired adjustment, since at the higher speeds a given percentage error will necessarily demand a greater adjustment in the rate of motion of the transit car.

Figure 10:
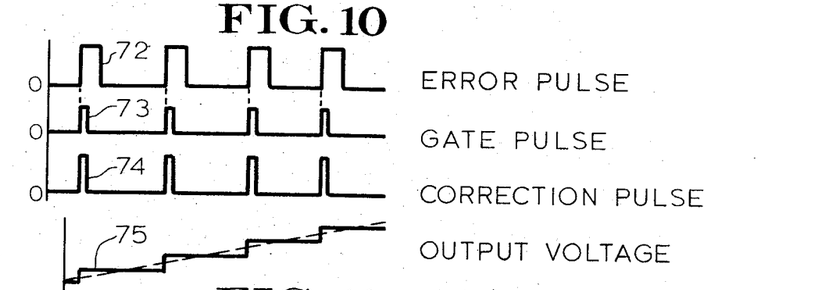
FIG. 10 is an illustration of waveforms useful in understanding the functioning of the speed detector of the invention.

The effect of varying the gate pulses can be best illustrated by reference to FIGS. 10 and 11. In FIG. 10, for a higher speed, the gate pulse 73 is seen to be considerably narrower than the error pulse 72, which it will be recalled is of a fixed duration established by monostable multivibrator 52. Only during the occurrence of the gate pulse in waveform 73 is a correction pulse applied to the storage integrator 57, as shown by waveform 74. Waveform 75 illustrates the effect of the correction pulse on the voltage level in storage integrator 57, each correction pulse resulting in a stair-step adjustment in the output voltage. It will be appreciated that had the gate pulse not been width-modulated, the full error pulse would have been provided as a correction pulse to integrator 57, resulting in an excessive step increase in the output voltage.

Figure 11:
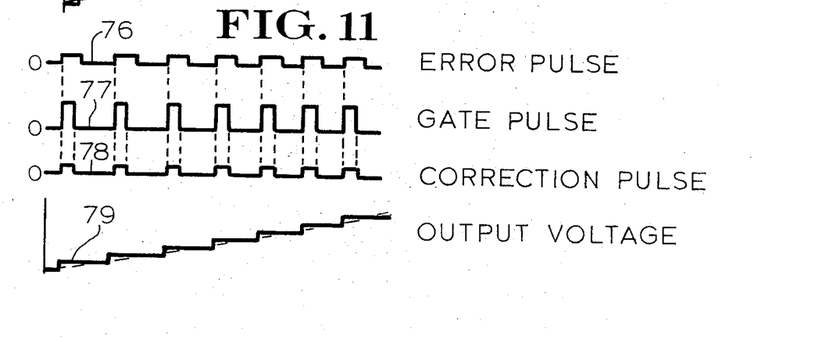
FIG. 11 is a further illustration of waveforms useful in understanding the functioning of the speed detector of the invention.

In FIG. 11 error pulses 76 are shown for a speed error of the same absolute magnitude as that represented by the error pulses 72 in FIG. 10, but occurring at a higher vehicle speed. It is seen that because of the higher speed the percentage error is less and accordingly, the error pulses are of a lower amplitude. If these error pulses were applied to storage integrator 57 with gating pulses of the same width as the gating pulses 73 in FIG. 10, insufficient correction to the output voltage would result. However, because the gate pulses, as evidenced by waveform 77, have a greater width at the higher speed the resulting correction pulses, while of lesser amplitude than the correction pulses of FIG. 10, are of sufficiently greater width to have the same effect on the output voltage developed in storage integrator 57, as shown by waveform 79. As a result, the output voltage changes for speed errors of like magnitude and substantially identical, notwithstanding that the speed errors occur at different vehicle rates and hence differ in percentage of error to the respective nominal speeds then existing. It will be appreciated that other methods could be employed for controlling the magnitude of the correction applied to integrator 57, such as providing a variable resistance device having a resistance characteristic dependent on the speed of the vehicle in series between the error and storage integrators.

Thus far we have assumed that the charging rate of the capacitor in error integrator 54 is contant, so that a constant ramp-like voltage function is obtained across the capacitor. This result can be obtained by providing a constant current source in connection with discharge control circuit 53, the latter circuit serving to interrupt or establish current flow from this source into the capacitor as dictated by monostable multivibrator 52. By adjusting the current provided by the current source, or by providing an appropriate series resistance in the charging path, such an arrangement can be made to provide an analog output signal at amplifier 58 indicative of the speed error of a vehicle from a predetermined reference speed.

However, a more useful arrangement is to utilize the output signal from amplifier 58 as a source of charging current for the capacitor in error integrator 54. To this end the output of amplifier 58 is connected in FIG. 6 to discharge control circuit 53, which controls the application of this current to the integrator. It will be appreciated that this connection establishes an integrating loop, such that the analog signal developed at the output of amplifier 58 becomes indicative of the actual speed of the vehicle, instead of being indicative of the speed error from a predetermined reference speed.

As the speed of the vehicle increases, the positive-polarity error pulse developed by error integrator 54 causes an increase in the voltage level in storage integrator 57, which in turn causes an increased output from amplifier 58. This greater output causes an increase in the rate in which the integrating capacitor in error integrator 54 is charged through discharge control circuit 53, until the error pulse from integrator 54 is eventually reduced to zero and a new equilibrium condition is established with the analog output of amplifier 58 at a higher level. Similarly, for a decreased speed level the negative error pulse from error integrator 54 reduces the output of storage integrator 57, and hence the output of amplifier 58. This in turn decreases the charging rate of the capacitor in error integrator 54, until the negative error pulse is eventually eliminated and a new equilibrium level is established in the system with the analog output of amplifier 58 at a lower voltage level. Thus, the output of speed detector 25 is made to closely follow changes in vehicle speed.

The variable width pulse generator 60 assures that the error pulses conveyed from integrator 54 are proportioned to the actual magnitude of the speed error. Differentiating circuit 59 provides an output when the rate of vehicle speed is changing, as during acceleration or deceleration, and to that end may be entirely conventional in design and construction. The resulting output from differentiating circuit 59, a voltage function of the form $ds/dt$, is particularly useful in automatic train control circuits for controlling the rate of acceleration or deceleration.

Figure 12:
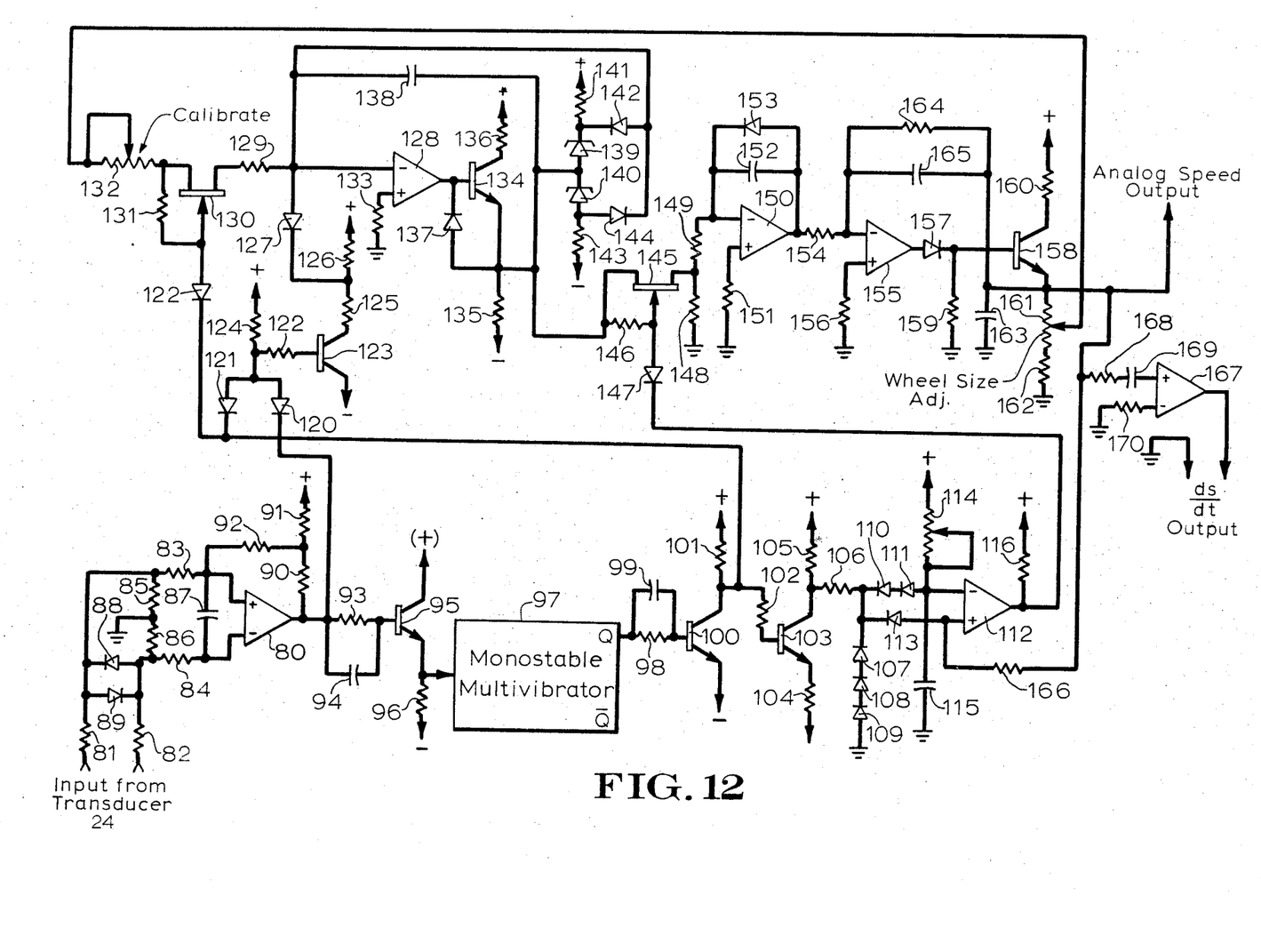
FIG. 12 is a simplified schematic diagram of an analog speed detector constructed in accordance with the invention.

Having considered the operation of the speed detector as an integral system, reference will now be made to the circuitry of this detector as illustrated by the simplified schematic of FIG. 12. The signal processing stage 50 of speed detector 25 comprises a conventional zero-crossing detector 80 having its inverting and non-inverting inputs coupled to the output of transducer 24. The coupling is accomplished by means of a pair of series-connected isolation resistors 81 and 82, and a pair of series-connected biasing resistors 83 and 84. A second pair of biasing resistors 85 and 86 are coupled between ground and the non-inverting and inverting inputs, and a capacitor 87 is shunt-connected across the input to prevent noise and other transients from entering the zero-crossing detector. A pair of diodes 88 and 89 are connected in opposite polarity across the input to limit the peak amplitude of the transducer output at high operating speeds. A feedback network comprising a pair of series resistors 90 and 91 connected between the output of zero-crossing detector 80 and a positive-polarity current source, and a resistor 92 connected between the juncture of resistors 90 and 91 and the non-inverting input of detector 80 are provided to stabilize the detector.

The output of detector 80 is coupled by the parallel combination of a resistor 93 and a capacitor 94 to the base of an NPN transistor 95, which is connected in an emitter-follower configuration to provide across an emitter load resistor 96 a non-inverted signal to the input of a monostable multivibrator 97, which may be conventional in design and construction. The collector of transistor 95 is connected to a lesser positive-polarity unidirectional current source and the emitter is connected by resistor 96 to a greater negative-polarity unidirectional current source. The output of multivibrator 97 is coupled by the parallel combination of a resistor 98 and a capacitor 99 to the base of an NPN transistor 100. The emitter of transistor 100 is connected to a negative-polarity current source, and the collector is connected by a load resistor 101 to a source of positive-polarity current.

The collector of transistor 100 is also connected by a resistor 102 to the base of an NPN transistor 103, which comprises part of a variable width pulse generator. The emitter of transistor 103 is connected to a negative-polarity current source by a resistor 104 and the collector is connected to a positive-polarity current source by a load resistor 105. The collector of transistor 103 is connected to ground by the series combination of a resistor 106 and three cathode to anode connected diodes 107–109. The juncture of resistor 106 and diode 107 is connected by a pair of series-connected diodes 110 and 111 to the inverting input of a second zero-crossing detector 112, and by a diode 113 to the non-inverting input of the detector. The inverting input of detector 112 is further connected by a variable resistor 114 to a source of positive current source and by a timing capacitor 115 to ground. The output of zero-crossing detector 112 is connected to a positive-polarity current source by a resistor 116.

To control the operation of the error integrator in the speed detector the output of zero-crossing detector 80 is connected to the cathode of a diode 120, and the collector of transistor 100 is connected to the cathode of a diode 121 and a diode 122. The anodes of diodes 120 and 121 are connected together and by a resistor 122 to the base of a charge control switch, NPN transistor 123. The juncture of diodes 120 and 121 is also connected by a resistor 124 to a source of positive-polarity current. The collector of transistor 123 is connected by series-connected resistors 125 and 126 to a source of positive unidirectional current. The juncture of these resistors is connected to the cathode of a diode 127, the anode of which is connected to the inverting input of a differential amplifier 128. The inverting input of amplifier 128 is also connected by a resistor 129 to the drain electrode of a field effect transistor (FET) 130, the gate electrode of which is connected to the anode of diode 122. The source electrode of FET 130 is connected by a resistor 131 to the gate electrode and to one end terminal of a calibration potentiometer 132. The non-inverting input of differential amplifier 128 is connected to ground by a resistor 133.

The output of differential amplifier 128 is connected to the base of an NPN transistor 134. The emitter of transistor 134 is connected to a negative-polarity current source by a resistor 135 and the collector of this transistor is connected to a positive-polarity current source by a load resistor 136. The emitter of transistor 134 is further coupled by a voltage-limiting diode 137 back to the base, and by an integrating capacitor 138 to the inverting input of differential amplifier 128. The latter connection serves to establish amplifier 128 and capacitor 138 in an integrating circuit configuration, the operation of which will be explained in detail presently.

To limit the voltage swing at the emitter of transistor 134, the emitter is connected to the anode of a zener diode 139 and the cathode of a zener diode 140. The cathode of zener diode 139 is connected to a positive-polarity current source by a resistor 141 and to the cathode of a diode 142. The anode of zener diode 140 is connected to a negative-polarity current source by a resistor 143 and to the anode of a diode 144. The cathode of diode 144 and the anode of diode 142 are connected to the inverting input of differential amplifier 128.

To convey the error pulses developed at the emitter of transistor 134, to the storage integrator, the emitter of that device is connected to the source electrode of an FET 145. The source electrode of FET 145 is also connected by a resistor 146 to the gate electrode, and the gate electrode is further connected to the anode of diode 147. The cathode of diode 147 is connected directly to the output of zero-crossing detector 112 for the purpose of receiving the variable-width gating pulses developed thereat. The drain electrode of FET 145 is connected by a resistor 148 to ground and by a resistor 149 to the inverting input of a differential amplifier 150. The non-inverting input of differential amplifier 150 is connected to ground by a resistor 151 and the output of amplifier 150 is connected back to the inverting input by the parallel combination of an integrating capacitor 152 and an anode to cathode connected diode 153. The latter connection establishes amplifier 150 and capacitor 152 in an integrating circuit configuration, the voltage developed across capacitor 152 appearing at the output of the amplifier.

The output of differential amplifier 150 is connected by a series resistor 154 to the inverting input of a differential amplifier 155. The non-inverting input of differential amplifier 155 is connected to ground by a resistor 156. The output of amplifier 155 is coupled by an anode to cathode connected diode 157 to the base of an NPN transistor 158, and by a resistor 159 to ground. The collector of transistor 158 is connected by a resistor 160 to a positive-polarity current source, and the emitter is connected by the series combination of a wheel size adjustment potentiometer 161 and a fixed resistor 162 to ground. The emitter is further connected by a capacitor 163 to ground and by the parallel combination of a resistor 164 and a capacitor 165 back to the inverting input of differential amplifier 155. The emitter of transistor 158 is also connected by a resistor 166 to the non-inverting input of zero-crossing detector 112. The analog speed output signal of the speed detector is obtained by way of a direct connection to the emitter of transistor 158 and a connection to the arm of potentiometer 161 is connected to the remaining end terminal and arm of calibration potentiometer 132.

The non-inverting input of amplifier 167 is connected by the series combination of resistor 168 and a capacitor 169 to the emitter of transistor 158. The inverting input of amplifier 167 is connected to ground by a resistor 170 and a differential output signal $ds/dt$ is obtained by direct connection to the output of the amplifier.

In operation, the output of the axle-mounted transducer is applied to the inverting and non-inverting inputs of zero-crossing detector 80, which converts the generally sine-wave signal to a square-wave control signal of like frequency. Input bias for detector 80 is provided by resistors 83-86, diodes 88 and 89 limit the amplitude of the input signal, and resistors 81 and 82 limit the loading of the transducer. Capacitor 87 prevents high frequency noise and transients from entering the detector.

Typically, the output of zero-crossing detector 80 may vary from −15 volts to +13 volts. Positive feedback is provided by resistors 90-92 to obtain a symmetrical hysteresis at the input with a resulting square-wave output signal having a 50 percent duty cycle at all frequencies. Transistor 95 is connected as an emitter follower and serves to limit the 28 volt output of zero-crossing detector 80 to 5 volts, as required at the input of multivibrator 97.

Multivibrator 97 may be a conventional monostable multivibrator and is biased to produce a positive-polarity output pulse of predetermined duration upon the application of a negative-to-positive transition at its input. The output pulse is applied to transistor 100 by resistor 98 and capacitor 99, wherein it is amplifier and inverted.

The circuitry of transistor 103 and zero-crossing detector 112 develop a positive pulse which starts with the negative edge of a signal from transistor 100 and lasts for a period determined by the output voltage of the detector with a maximum width equal to the pulse developed by monostable multivibrator 97. To this end, transistor 103 is biased so as to conduct when a negative pulse is not present at the collector of transistor 100. While transistor 103 is conducting, the collector of the transistor assumes a negative voltage level, typically −5 volts, which allows current to flow through resistor 106 and diodes 107-109. The voltage at the junction of resistor 106 and diodes 107-110, and 113 is negative at this time, typically approximately −1.8 volts, because of the 0.6 volt drop of the three series-connected diodes 107-109. The voltage at the inverting input of zero-crossing detector 112 is positive with respect to the −1.8 volt value by the drop of the two series-connected diodes 110 and 111, or −0.6 volts. The voltage at the non-inverting input is positive with respect to the 31 1.8 volt reference by the drop of diode 113 of 0.6 volts, or −1.2 volts. Since the non-inverting input is more negative, the output of zero-crossing detector 112 is negative. When the signal on the collector of transistor 100 is negative, transistor 103 is cut off and the collector voltage thereon rises to the supply voltage, in this case +15 volts. Diode 113 is now reverse biased so that the voltage at the non-inverting input of detector 112 is free to rise to the level of the output voltage which is applied through resistor 166. Diodes 110 and 111 are also reverse biased, but the voltage at the inverting terminal cannot immediately change because capacitor 115 must charge through resistor 114. Because the non-inverting input is at a positive voltage and the inverting input is at a less positive voltage, the output of zero-crossing detector 112 remains positive until the charge on capacitor 115 exceeds the output voltage of the speed detector. The result is that the higher the output voltage, the longer capacitor 115 must charge, and the wider the positive-polarity pulse produced at the output of zero-crossing detector 112.

While the output of zero-crossing detector 80 and the output of transistor 100 are both positive, diodes 120 and 121 are cut off and transistor 123 is biased into saturation by virtue of resistors 122 and 124. This causes the juncture of resistors 125 and 126 to become negative, causing diode 127 to conduct and drive the inverting input of differential amplifier 128 negative. Since amplifier 128 is connected with capacitor 138 and power amplifier transistor 134 in an integrating circuit, the application of a negative-polarity current to the inverting input causes the positive output of that amplifier, amplified by transistor 134, to force the juncture of zener diodes 139 and 140 positive. The voltage swing is accommodated by changing current flow through zener diodes 139 and 140, but is limited such that when the voltage exceeds either zener value, the appropriate one of diodes 142 and 144 conducts and a counteracting voltage is applied to the inverting terminal of amplifier 128 to cancel any further excursion at its output.

When the square-wave developed at zero-crossing detector 80 becomes negative, transistor 123 is cut off and the current applied to the inverting input is derived from the speed detector output voltage through potentiometer 132, FET 130 and resistor 129. Since the input is now a positive-polarity current, the output of amplifier 128 attempts to go negative. However, since capacitor 138 is connected from output to input, the rate of change of the voltage at the output depends on the current flow into capacitor 138. FET 130 acts as a switch to control this current flow, allowing the current to continue until the square-wave from detector 80 becomes positive, which causes a negative pulse from transistor 100 to be applied to its gate electrode. It will be recalled that the voltage existing across capacitor 138 at the end of this discharge period is dependent on the length of the period, and may be of either positive or negative polarity depending on whether the period is shorter or longer than the then nominal charging period of the capacitor. Resistors 132 and 129 and the magnitude of the output signal developed by transistor 158 determine the rate of discharge of capacitor 138, and hence nominal speed recognized by the error integrator.

When the square-wave control signal developed at the output of zero-crossing detector 80 becomes positive and triggers multivibrator 97, the resulting negative-polarity output pulse from transistor 100 cuts off transistor 123 and FET 130. The result is that the charging of capacitor 138 is suspended, and the output of amplifier 128, as obtained at the emitter of transistor 134, remains constant for the duration of the pulse. It is during this period that the output of amplifier 128, an error-indicative signal, is transferred to the storage integrator by FET 145. When the output of transistor 100 again becomes positive, corresponding to the end of the output pulse from multivibrator 97, transistor 123 is again rendered conductive and capacitor 138 is charged in the opposite direction of its discharge through FET 130 to a predetermined maximum level, as determined by zener diode 139, and the operating cycle is repeated.

Thus, the error integrator portion of the speed detector operates in response to the square-wave from detector 80 and the pulse from multivibrator 97 in a three-step cycle; (1) capacitor 138 is initially charged by a current through transistor 123 to a predetermined maximum voltage, (2) capacitor 138 is discharged by a current through FET 130 at a rate dependent on the output voltage produced by the speed detector, and (3) the discharging capacitor 138 is terminated and the voltage then appearing across the capacitor is transferred to a subsequent storage integrator wherein it establishes an analog output signal.

It will be recalled that the conduction of FET 145 is controlled by variable-width gating pulses generated at the output of zero-crossing detector 112, and that the width of the gating pulses is dependent on the analog output voltage level of the speed detector. The gating pulses are applied to FET 145 only during that time in which the output voltage of differential amplifier 128 is constant by virtue of FET 130 and transistor 123 being cut off. The error voltge existing at the output of amplifier 128, and hence at the emitter of transistor 134, is applied through FET 145 by way of resistor 149 to the inverting input of differential amplifier 150. Amplifier 150 is connected with capacitor 152 in a conventional integrator circuit configuration, and as such develops a DC output voltage indicative of the amplitude of the error pulses last conveyed to the inverting input by FET 145. The effect of the pulses conveyed depends on their amplitude, polarity and duration, and as we have seen, the width of the gating pulse applied to the gate electrode of FET 145 is varied so that the effectiveness of the pulses is proportional to the absolute speed error. Diode 153 prevents the charge on capacitor 152 from becoming excessively positive, since otherwise the charge on capacitor 152 would become that of the supply voltage during an extended stop, which would cause an undesirable time delay in speed detection when subsequently starting up.

The DC voltage developed at the output of differential amplifier 150 is applied by resistor 154 to the inverting input of differential amplifier 155. This amplifier, together with transistor 158, acts as an inverting output amplifier which provides the necessary current gain to drive a low impedance load. Capacitors 163 and 165 provide filtering to smooth the voltage steps encountered as the speed of the vehicle changes and to prevent high frequency transients from appearing in the output. Potentiometer 161 permits adjustment of the output voltage for varying wheel sizes. For a full 32 inch wheel a greater voltage will be required, and potentiometer 161 is adjusted to its lower end so that only a portion of the output voltage will be fed back to integrating capacitor 138 through FET 130. As a result, the circuit will produce a somewhat higher output in order to balance the relationship between the voltage fed back to the error integrator and the pulse rate. When the wheel size is at a minimum, the pulse rate is higher for the same speed and potentiometer 161 is toward transistor 158 so that a greater proportion of the output voltage will be fed back to capacitor 138, thus reducing the output voltage for a given pulse rate. Resistor 164 provides a stabilizing negative feedback path for the output stage.

The differentiating circuit operates in a conventional manner to provide an output during changes in the analog speed output developed by the detector. In this regard, resistor 168 and capacitor 169 serve as a conventional differentiating network, the voltage developed thereby being amplified in the differential amplifier 167 prior to being applied to an external system.

Thus, the structure and operation of a speed detector has been described which provides from an axle-mounted transducer an analog speed-indicative output signal having improved accuracy and improved responsiveness to changes in speed. The circuit is stable and simple in design and construction, and by virtue of its novel arrangement of capacitor charging and discharging circuitry, together with timing and integrating circuitry, and its avoidance of large filtering capacitances which would adversely effect its responsiveness, lends itself to being incorporated in high performance transit cars, locomotives, automobiles, or in other vehicles where it is necessary to instantaneously know the speed of a vehicle, either as an indication to an operator, or as an input to an automated speed control or anti-skid system. Furthermore, the speed detector of the present invention provides an accurate indication of very low operating speeds, making it particularly attractive for use on railroad locomotives for controlling very low speed operation during switching or freight loading operations.

The analog speed detector of the present invention may also be incorporated in an integral vehicle speed indicating instrument. In this connection, it may be employed with either a speed-calibrated meter, or with a digital readout display. In the latter case, the analog speed signal developed by the detector would be converted to the necessary digital format by means of known conversion circuitry.

It will be understood that modifications and variations may be effected without departing from the scope of the novel concepts of the present invention, but it is understood that this application is to be limited only by the scope of the appended claims.

The invention is hereby claimed as follows:

1. A speed detector for producing from an input signal having a repetition rate related to the actual speed of a moving vehicle an analog output signal indicative of the speed of said vehicle, comprising, in combination:
    means responsive to said input signal for generating a control signal defining first and second operating periods;
    error detection means for generating an error signal, said error signal progressively changing during said first operating period from a first predetermined initial voltage level to a final voltage level, said final voltage level being dependent on the duration of said first operation period and on the rate at which said error signal progressively changes, and remaining at said final voltage level during at least a portion of said second operation period;
    integrator means for developing an output signal having a level dependent on the amplitude and polarity of momentarily applied signals;
    means for applying said error signal at said final voltage level to said integrator means during at least a portion of said second operating period; and
    means responsive to the output signal developed by said integrator means for controlling the rate at which said error signal progressively changes during said first operating period such that said output signal developed by said storage means comprises an analog signal indicative of the speed of said vehicle.

2. A speed detector as defined in claim 1 wherein said control signal is a square-wave, said first and second operating cycles comprising alternate half-cycles thereof.

3. A speed detector as defined in claim 2 which further includes means responsive to said square-wave control signal for generating a control pulse of predetermined duration, and wherein said error detection means are responsive to said control pulse in generating said error signal.

4. A speed detector as defined in claim 3 which further includes compensating means responsive to the speed of said vehicle for proportioning the effect of said error signal on said output voltage to the speed of said vehicle.

5. A speed detector as defined in claim 4 wherein said compensating means comprise means for generating a gating pulse width-dependent on the speed of said vehicle, and transfer means serially disposed between said error detector and said storage means and responsive to said gating pulse for controlling the portion of said error signal applied to said storage means.

6. A speed detector for producing from an electrical speed-indicating input signal having a repetition rate related to the actual speed of a moving vehicle an analog output signal indicative of the speed of said vehicle, comprising, in combination:
    means responsive to said speed-indicating input signal for generating a control signal defining first and second operating periods;
    an error integrating capacitor;
    charging means for establishing an initial charge condition of predetermined magnitude and polarity on said capacitor prior to said first operating period;
    discharging means for applying a predetermined current of opposite polarity to said capacitor during said first operating period, the voltage across said capacitor progressing from a predetermined initial voltage level to a final voltage level at the end of said operating period, said final voltage level being dependent on the duration of said period;
    storage means for developing an analog output signal representative of the amplitude of momentarily applied signals;
    transfer means for coupling said capacitor to said storage means during at least a portion of said second operating period to apply at least a portion of the final voltage existing across said capacitor thereto; and
    means responsive to the analog output signal developed by said storage means for controlling the charging rate of said capacitor during said first operating period such that said output signal developed by said storage means comprises an analog output signal indicative of the speed of said vehicle.

7. A speed detector as defined in claim 6 wherein said control signal is a square-wave signal and said first and second operating periods correspond to alternate half-cycles thereof.

8. A speed detector as defined in claim 7 wherein said means for coupling said capacitor to said storage means are responsive to and function only during a portion of the second half-cycle of said square-wave.

9. A speed detector as defined in claim 8 which further includes means responsive to the transition of said square-wave control signal from its first half-cycle to its second half-cycle for producing a control pulse having a predetermined duration, less than said second operating period, and wherein said charging and discharging means are rendered inoperative by said control pulse.

10. A speed detector as defined in claim 6 which further includes compensating means responsive to the speed of said vehicle for proportioning the effect of said error signal on said output voltage to the speed of said vehicle.

11. A speed detector as defined in claim 10 wherein said compensating means comprise means for generating a gating pulse width-dependent of the speed of said vehicle, and transfer means serially disposed between said error detector and said storage means and responsive to said gating pulse for controlling the portion of said error signal applied to said storage means.

12. A speed detector as defined in claim 6 which further comprises an inverting amplifier having its input coupled to one terminal of said error integrating capacitor and its output coupled to the other terminal of said capacitor to form an error integrating circuit, and wherein said charging means and discharging means are coupled to said input terminal to alternately cause current flow thereto in opposite directions.

13. A speed detector as defined in claim 12 wherein said charging means include a first avalanche diode coupled between the output of said amplifier and said input for opposing further charging of said capacitor beyond said initial charge condition.

14. A speed detector as defined in claim 13 wherein said discharging means include a second avalanche diode coupled between the output of said amplifier and said input for opposing discharge of said capacitor beyond a predetermined terminal charge condition.

15. A speed detector as defined in claim 6 which further comprises an amplifier for amplifying the output of said storage means to develop said analog output signal.

16. A speed detector for producing from an input signal having a frequency related to the actual speed of a moving vehicle, an output signal indicative of the error between the actual speed of said vehicle, and a predetermined nominal speed, comprising, in combination:

means responsive to said speed-indicating signal for generating a control signal defining first and second operating periods;

error detection means for generating an error signal, said error signal progressively changing during said first operating period from a predetermined initial voltage level to a final voltage level dependent on the duration of said first operating period, and remaining thereat during at least a portion of said second operating period;

means for controlling the rate of progression of said error signal such that said final error voltage level comprises a predetermined reference voltage level when said vehicle is operating at a predetermined nominal speed;

storage means for developing an output signal representative of the amplitude of signals periodically applied thereto; and means for applying said error signal existing at the end of said first operating period to said storage means during at least a portion of said second operating period such that said output signal is indicative of the error between said actual speed and said nominal speed.

* * * * *

UNITED STATES PATENT AND TRADEMARK OFFICE
CERTIFICATE OF CORRECTION

PATENT NO. : 3,867,647
DATED : February 18, 1975
INVENTOR(S) : Bernard E. Callahan and Philip M. Higgins It is certified that error appears in the above-identified patent and that said Letters Patent are hereby corrected as shown below:

In column 12, line 48, "31 1.8" should read -- -1.8 --; and

In column 17, line 11, "of" , first occurrence, should read -- on --.

Signed and Sealed this twenty-sixth Day of August 1975

[SEAL]

Attest:

RUTH C. MASON
*Attesting Officer*

C. MARSHALL DANN
*Commissioner of Patents and Trademarks*